United States Patent Office 3,436,247
Patented Apr. 1, 1969

3,436,247
FATTY ACID ALKANOLAMIDE AND ALKANOL-
AMINE COATING FOR FIBERBOARD AND CON-
TAINER FORMED THEREFROM
Harry E. Dunholter, Toledo, Ohio, assignor to Owens-
Illinois, Inc., a corporation of Ohio
No Drawing. Continuation-in-part of Ser. No. 474,518,
July 23, 1965. This application July 11, 1966, Ser. No.
564,000
Int. Cl. B05c 7/00; C03c 17/18
U.S. Cl. 117—95     16 Claims

ABSTRACT OF THE DISCLOSURE

This invention relates to an anti-abrasive paper, an anti-abrasive coating for paper, and anti-abrasive containers. More specifically, the invention at hand relates to the use of mixtures of fatty acid alkanolamides and alkanolamines as non-abrasive coatings for paper. The above-described coating composition can be used in conjunction with a viscosity improver. In use, relatively small quantities of the anti-abrasive coating compositions of this invention are applied to those areas of a container which come into contact with products being shipped therein. The coating composition of this invention minimizes the possibility of damage occurring to articles being shipped by the abrasive contact of the container with said article.

---

This is a continuation-in-part application of U.S. Ser. No. 474,518, filed July 23, 1965, now abandoned.

Broadly, this invention is concerned with a non-abrasive fiberboard and a container formed therefrom. Fiberboard type products are widely used for the manufacture of shipping containers, various types of inner packing, pallets, drums, etc. During shipment these components come into contact with the articles that are being shipped therein. Due to the abrasive qualities of the fiberboard, the surfaces of the articles being shipped are often detrimentally affected. That is, the coarse fibers of the fiberboard when in contact with the surface of the articles being shipped often cause wear spots, scuffs, polish marks, etc., on said articles. When the articles being shipped are to be subsequently sold in retail channels, this is a very serious problem due to the fact that the articles have to be resurfaced or otherwise repaired prior to sale. The problems described above are particularly acute with such items as automobile instrument panels, television bulb facings, appliances, etc. By means of the subject invention, these articles can be readily shipped so that they arrive with unmarked and unworn surfaces.

It is known to apply certain compounds to a fiberboard so as to impart a non-abrasive surface to said fiberboard. However, these prior coating compounds and compositions while achieving the non-abrasive qualities impart other undesirable properties to the fiberboard. For example, fiberboard coated with the prior art compositions often has an objectionable odor, the tensile strength is decreased, and the water absorbency is increased. By way of illustration, glycerin has been used in the past to impart a non-abrasive surface to fiberboard. While the desirable non-abrasive qualities are achieved with a glycerin-coated fiberboard, the glycerin decreases the tensile strength of the fiberboard, increases its water absorbency and imparts an objectionable damp feel to the fiberboard. Likewise, prior non-abrasive coating compounds include sodium oleate which tends to impart some non-abrasive qualities. However, the sodium oleate has poor aging qualities with the result that the coated fiberboard often develops an objectionable odor. Still another example of a prior art non-abrasive coating composition is wax, which tends to wear away easily and tends to detrimentally affect certain surfaces. Likewise, wax type coatings tend to flake off of the fiberboard surfaces and tend to accumulate dirt during handling. Generally, it might be said that the prior art coating compounds and compositions will impart a limited degree of non-abrasiveness to the fiberboard substrate. However, the disadvantages entailed in their use far outweigh the advantages.

In contrast, the fiberboard and container formed therefrom of the subject invention exhibit excellent non-abrasive qualities. Likewise, the tensile strength of the fiberboard is not decreased, the water absorbency characteristics are not detrimentally affected, no objectionable odor is imparted to the fiberboard or container formed therefrom, the coating is inert, and the anti-abrasive qualities are not changed with age. The coated fiberboard of this invention is particularly suited to the shipment of articles which are manufactured from Lucite type plastics and glass articles which have been ground to optical quality.

The above described results are achieved by coating the fiberboard surface with a mixture of fatty acid alkanolamides and alkanolamines. The prior art teaches the use of this type of material as a treating agent for textiles to improve their pliability, draping, hand, etc. The prior art does not teach the use of these compositions as non-abrasive coatings for fiberboard.

The anti-abrasive coating composition of this invention is represented by the formulae

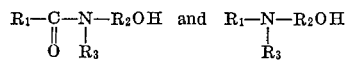

wherein $R_1$ is a saturated aliphatic group containing from 8 to 22 carbon atoms, $R_2$ and $R_3$ are independently hydrogen, straight or branch chain alkyl containing from 1 to 8 carbon atoms, straight or branched chain alkanol having from 1 to 8 carbon atoms, aryl substituted and unsubstituted amino or substituted and unsubstituted amido.

The alkanolamide component of the alkanolamide-alkanolamine coating composition of this invention comprises from about 60 to about 90 percent of the mixture. The relative percentages of these components can be varied by varying the reaction conditions.

The fatty acid alkanolamide and alkanolamine compositions of this invention are produced by the reaction of an alkanolamine with a fatty acid. Alkanolamines adapted for use in this invention are represented by the formula

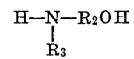

wherein $R_2$ and $R_3$ are as defined above.

Specific alkanolamines may be utilized along with mixtures of these compounds in the process of this invention.

The subject invention is adapted to utilize a wide range of fatty acids. Fatty acids adapted for use in the preparation of the coating compositions utilized in this invention include, for example, valeric, isovaleric, pivalic, caproic, enanthic, ethylhexanoic, caproylic, pelargonic, capric, undecylic, lauric, myristic, palmitic, stearic, oleic, nondecanoric, arachidic, lignoceric and cerotic. A preferred composition adapted for use in this invention is produced by reacting diethanolamine with a commercial grade of stearic acid which is in fact, a mixture of stearic and palmitic acids. Fatty acid mixtures of alkanolamide and alkanolamine type compositions adapted for use in the subject invention are available on a commercial basis from the Burkart-Schier Chemical Company, Chattanooga, Tenn. under the trademark Fibacon 325.

The fatty acid mixtures of alkanolamides and alkanolamines as used in the subject invention are prepared by the reaction of from about 25 to about 75 weight percent of an alkanolamine with from about 75 to about 25 weight percent of a fatty acid at a temperature of from about 125 to about 175° C., at atmospheric pressure, for a period of time of from about 2 to about 16 hours. The preferred coating composition adapted for use in this invention is prepared by the reaction of about 70 weight percent of a mixture comprising 45 percent by weight of stearic acid and 55 percent by weight of palmitic acid, with about 30 percent of diethanolamine. This preferred reaction is carried out at a temperature of about 150° C. for about 4 hours at atmospheric pressure.

The alkanolamide and alkanolamine coating compositions of this invention may be produced by the blending of several fatty acid alkanolamide-alkanolamine mixtures to produce a composition having properties which are adapted to various modes of application. In the application of these compositions the viscosity of the composition is of prime importance. Likewise, the viscosity of the fatty acid derivatives of the alkanolamide-alkanolamine mixture varies with the fatty acid substituent. Accordingly, desired fatty acid alkanolamide-alkanolamine compositions are produced by the blending of various fatty acid substituted compounds.

The fatty acid alkanolamide-alkanolamine coating compositions of this invention are applied as aqueous dispersions. These aqueous dispersions tend to be very viscous, accordingly, viscosity improvers in suitable amounts are added. Examples of suitable viscosity improvers are formic acid, lactic acid, citric acid and Green MX dye. Green MX dye is sold by the American Cyanamid Company and is thought to be a salt of tetramethyl-paraaminotriphenylcarbinol. These viscosity improvers are present in the coating composition in amounts from about 0.5 to about 3 percent. A more preferred range for these viscosity improvers is from about 0.7 to about 1.2 percent with a most preferred percentage being 0.71 percent. While the exact mechanism whereby these viscosity improvers alter the coating compositions of this invention is not known, these viscosity improvers generally convert a heavy viscous unworkable composition into a workable composition.

Small percentages of other components can also be present in the coating composition as used in this invention. For example, anti-foaming agents are often utilized in conjunction with the above described coating composition.

The mixed fatty acid alkanolamide and alkanolamine compositions of the subject invention can be applied to fiberboard substrates by many methods, such as spraying, brushing, etc. However, the most practical method of application entails the use of rotogravure system and/or flexographic system with intermediate drying capacity for linerboard treatment. For large volume applications, the coating compositions of this invention can be applied at the size press or at the calender stack during the manufacture of the linerboard.

When a rotogravure system and/or a flexographic system is utilized as a coating means, the coating composition should comprise from about 5 percent to about 25 percent of mixed fatty acid alkanolamides and alkanolamines, from about 0.7 to about 3 percent of Green MX dye or from about 0.7 to about 3 percent lactic acid, the balance being substantially water. A more preferred range of percentages is from about 10 to about 20 percent of the mixed fatty acid alkanolamides and alkanolamines, from about 0.7 to about 1.25 percent of Green MX dye or lactic acid, the balance being substantially water. Upon coating to form the finished product most of the water is removed by evaporation. Accordingly, the final product contains a coating that comprises from about 5 to about 25 parts of a mixed alkanolamide and alkanolamines and from about 0.7 to about 3 parts of a viscosity improver.

A preferred composition for use with a rotogravure system consists essentially of about 13.20 percent of a stearic-palmitic acid derivative of ethanolamine, about 86.09 percent water and about 0.71 percent of Green MX dye.

The coating compositions of this invention are prepared by adding the fatty acid alkanolamide-alkanolamine mixture to preheated water which is held at a temperature of from about 100 to about 130° F. If desired, a coloring medium can be added at this stage. Upon dispersion of the fatty acid alkanolamide-alkanolamine mixture in the water, the temperature is raised to from about 120 to about 160° F., and held at this temperature until and during application of the coating to fiberboard substrate. If necessary, small percentages of an anti-foaming agent can now be added. The viscosity is now altered to the desired level for the mode of application, that is to be utilized by the addition of more water, fatty acid alkanolamide-alkanolamine mixture or a viscosity improver such as formic acid, citric acid, lactic acid or Green MX dye. The non-abrasive coating solution is now ready for coating a packaging media such as kraft liner, imitation kraft liner, bleached kraft liner, or jute linerboard. The kraft may be of the cylinder or fourdrinier variety.

After application, the coating composition is absorbed by the surface portion of the fiberboard and its water content is lost by evaporation so as to produce a fiberboard having non-abrasive surface properties. The evaporation is effected by the use of a bank of heaters or drying drums in a conventional manner.

The subject anti-abrasive coating composition has a pH of approximately 7. Due to the fact that this coating composition is neither acidic nor basic there is no tendency to etch articles which are in contact with said coating.

The relative acidity or basicity of a coating composition is extremely important in environments which are in contact with television picture tube components; i.e. if a coating is alkaline and is in contact with a television faceplate the coating in conjunction with atmospheric moisture will etch the surface of the faceplate with the net result the faceplate will have to be repaired prior to use. None of the above discussed problems are encountered when the coating composition of this invention is utilized. Accordingly hypersensitive articles such as television faceplates can be shipped in containers which are coated with anti-abrasive coating compositions of this invention.

When applied to paper the coating composition of this invention does not significantly affect the strength properties of the paper in question. This fact is obvious from the data as expressed in Tables 1 and 2.

Table 1 is a compression data for 275 pound C Flute Corrugated board. As it can be seen from the average figures, this board will accept an average load of 675 pounds.

TABLE 1.—275 POUND C FLUTE CORRUGATED

| Load (lb.): | Deflection at failure (in.) |
| --- | --- |
| 635 | 0.16 |
| 660 | 0.18 |
| 665 | 0.17 |
| 715 | 0.20 |
| 700 | 0.17 |
| 675 [1] | [1] 0.176 |

[1] Average.

The data as expressed in Table 2 is for 275 pound C Flute Corrugated board which is coated with the coating composition of this invention. For these tests the corrugated board is coated to a coating weight of about 2 pounds dry per M s.f. As can be seen the coated corrugated board in this case would accept an average load of 654 pounds. The difference between the average figures as expressed in Tables 1 and 2 is thought to be insignificant for normal usage.

TABLE 2

| Load (lb.): | Deflection at failure (in.) |
|---|---|
| 585 | 0.20 |
| 660 | 0.20 |
| 650 | 0.20 |
| 720 | 0.17 |
| 655 | 0.20 |
| 654 [1] | 0.194 [1] |

[1] Average.

Likewise, it can be seen from Table 1 and 2 that the difference in deflections at failure between the coated and uncoated sample is also insignificant.

The subject anti-abrasive coating composition has a neutral electrical charge. As such, any dust particles which might result are neutral. Most articles pick up an electrical charge during manufacture and therefore tend to attract dust particles which have an electrical charge. Because the dust particles that result in accordance with this invention are neutral, articles which are shipped accordingly have a minimal tendency to collect dust.

Likewise, if dust particles should happen to be deposited for example by gravity they do not tend to cling tenaciously to the surface in question because there is no electrical attraction. As such, these dust particles can be removed readily by for example simple air blowing procedures.

It is to be noted that the subject coating composition does not utilize silicones which are extremely detrimental to coating procedures. Therefore, objects which are shipped in accordance with this invention can be readily coated or otherwise treated subsequent to shipment.

The fiberboard and container or inner packing of the subject invention can contain dry coating weights of from about 0.5 to about 5 lbs. per M s.f. (1,000 square feet) of coverage. A preferred range of coating weights is from about 1.8 to about 2.2 lbs. per M s.f. Generally, it can be said that below this range the non-abrasive qualities imparted to the fiberboard are of a lesser degree while coating weights above this range are to be avoided for economic reasons.

While this invention is applicable to a wide range of fiberboard products, it is particularly adapted for the coating of linerboard, said linerboard forming one surface of corrugated container board. Because the cellulose fibers of the linerboard are more susceptible to coating on the wire or unfinished side particularly desirable results are obtained by coating this type of surface. It is to be noted that the term coating, as used in regard to this invention, applies to surfaces which are in fact, coated and to surfaces which are impregnated with the compositions of this invention.

The above described coating compositions are not meant to be limiting in that the coating compositions of this invention can contain other ingredients in minor amounts such as dyes, pigments, anti-foam agents, anti-static agents, anti-oxidants, etc.

The amount of coating applied to the fiberboard and the areas to which it is applied are regulated by the articles which are to be shipped in the container which is formed from said fiberboard. For example, if the fiberboard is formed into a box for the shipment of television bulb faceplate, only the areas of the inner periphery of said box which contact the faceplate need be coated. However, if an article is shipped in a container that will contact many or all surfaces of the article, for example, an enamelled washing machine, the whole inner surface of the linerboard should be treated in accordance with the present invention to minimize or eliminate abrasion of the article.

The following examples will illustrate the fiberboard and containers which are part of the subject invention. These examples are given for purposes of illustration and not for purposes of restricting the scope of this invention. All parts given are by weight.

EXAMPLE I

A coating composition was prepared by the addition of 12 parts of Green MX liquid dye (product American Cyanamid Company), which was at a temperature of 75° F. to 1470 parts of water which is at a temperature of 120° F. To this was added 225 parts of Fibacon 325 (product of Burkart-Schier Chemical Company) which was at a temperature of 85° F. The composition was then mixed slowly until a homogeneous mixture was produced. The temperature during mixing was held constant at 120° F. One part of Dow Anti-Foam A (product Dow Chemical Company), was then added to this homogeneous mixture. The temperature of the mixture was then raised to 140° F. The composite coating composition exhibited a viscosity of 8–10 seconds measured at 140° F. with a No. 3 Zahn Cup viscometer.

The temperature of this coating composition was maintained at 140° F. The coating composition was then applied to the wire side of 69 lb. fourdrinier kraft linerboard, by means of a two station system of flexographic and rotogravure rolls with intermediate drying drums. The coating pickup had a range of 1.8 lbs. to 2.2 lbs. dry per M s.f. This coated fiberboard was tested in commercial use in the shipment of lucite plastic automobile instrument panels and glass television faceplates. In both cases, the products arrived at their destination free of scratches, mars, and scuff marks.

EXAMPLE II

A coating composition was prepared by the addition of 2 parts of Green MX dye to 1660 parts of water which was at a temperature of 120° F. To this solution was slowly added 249 parts of Fibacon 325 which was at a temperature of approximately 90° F. The solution was then mixed until a homogeneous mixture was obtained. The temperature during mixing was held at 120° F. After the dispersion was complete, the temperature was raised to 140° F. and 1 part Dow Anti-Foam A was added. The composite coating composition exhibited a viscosity of 8–10 seconds as measured at 140° F. with a No. 3 Zahn Cup viscometer.

The temperature of this coating composition was maintained at 140° F. The coating composition was then applied to the wire side of 69 lb. fourdrinier kraft linerboard by means of a two station system of flexographic and rotogravure rolls with intermediate drying drums. A coating range of 1.8–2.2 lbs. dry per M s.f. was achieved. The coated linerboard was fabricated into a finished container and tested with lucite plastic automobile instrument panels on an L.A.B. Vibrator for approximately 2 hours with no abrasion damage to the product.

EXAMPLE III

A coating composition was prepared by the addition of 10 parts of Fibacon 325 which was at a temperature of 85° F. to 90 parts of water which is at a temperature of 120° F. The Fibacon 325 and water were then mixed until a homogeneous mixture was produced. The temperature during mixing was held constant at 120° F.

The temperature of this coating composition was maintained at 90° F. The coating composition was then applied to the wire side of 42 lb. fourdrinier kraft linerboard by means of a No. 10 wire rod. A coating weight of 0.5 lb. dry per M s.f. was achieved. A coated linerboard was then dried at 212° F. The sample of this coated fiberboard was tested on a Sutherland Rub Tester against a polished aluminum panel having a hardness rating of 28. After 10 cycles the coated board was rated excellent versus other types of anti-abrasion coated board tested under the same conditions.

EXAMPLE IV

A coating composition was prepared by the addition of 60 parts of Fibacon 325 which was at a temperature of 90° F. to 340 parts of water which is at a temperature of 120° F. The Fibacon 325 and water were then mixed until a homogeneous mixture was produced. The temperature during mixing was held constant at 120° F. The temperature was then raised to 150° F. To this homogeneous mixture was added 0.6 part of (solid) citric acid. The composite coating composition exhibited a viscosity of 8–10 seconds as measured at 120° F. with a No. 3 cup on a Zahn cup viscometer.

The temperature of this coating composition was maintained at 120° F. The coating composition was then applied to the wire side of 69 lb. kraft linerboard. A coating of 2 lbs. per M s.f. was achieved. The coated linerboard was then dried at 212° F. for about 2 minutes. A sample of this coated fiberboard was tested on a 6″ x 10″ (.020″ thickness) polyflex panel at room temperature on an S and S Scuff Tester versus a control sample of 69 lb. uncoated fourdrinier kraft linerboard.

The coated sample resisted abrasion while the uncoated sample showed a high degree of abrasion of the polyflex plate.

EXAMPLE V

A coating composition was prepared by the addition of 30 parts of Fibacon 325 which was at a temperature of 90° F. to 170 parts of water which is at a temperature of 120° F. The Fibacon 325 and water were then mixed until a homogeneous mixture was produced. The temperature during mixing was held constant at 120° F. 0.3 part of Green MX dye was then added to this homogeneous mixture. The composite coating composition exhibited a viscosity of 8–10 seconds as measured at 120° F. with a No. 3 cup on a Zahn viscometer.

The temperature of this coating composition was maintained at 120° F. The coating composition was then applied to the wire side of 69 lb. fourdrinier kraft linerboard. A coating of 2.2 lbs. per M s.f. was achieved. The coated linerboard was then dried at 212° F. for approximately 2 minutes. The coated sample 1¹¹⁄₁₆″ x 11″ was tested against a 6″ x 10″ panel of (.020″ thickness) polyflex plastic by means of an S and S Scuff Tester versus a sample 1¹¹⁄₁₆″ x 11″ of uncoated 69 lb. fourdrinier kraft linerboard for 5 cycles. The coated sample showed a high degree of resistance to abrasion while the uncoated sample showed severe abrasion.

EXAMPLE VI

A coating composition was prepared by the addition of 60 parts of Fibacon 325 which was at a temperature of 90° F. to 340 parts of water which is at a temperature of 120° F. The temperature of the mixture was raised to 150° F. 2.4 cc. of Lactic Acid (USP 85% active), was then added to this homogeneous mixture. The composite coating composition exhibited a viscosity of 16 seconds as measured at 120° F. with a No. 3 cup on a Zahn viscometer.

The temperature of this coating composition was maintained at 120° F. The coating composition was then applied to the wire side of 69 lb. fourdrinier kraft linerboard. A coating of 2 lbs. per M s.f. was achieved. The coated linerboard was then dried at 212° F. for approximately 2 minutes. A sample of this coated fiberboard was tested on a 6″ x 10″ polyflex panel (.020″ thickness) at room temperature on an S and S Scuff Tester versus a control sample of 69 lb. uncoated fourdrinier kraft linerboard. The coated sample resisted abrasion while the uncoated sample showed a high degree of abrasion on the polyflex panel after ten cycles.

EXAMPLE VII

A coating composition was prepared by the addition of 60 parts of Fibacon 325 which was at a temperature of 90° F. to 340 parts of water which is at a temperature of 120° F. The Fibacon 325 and water were then mixed until a homogeneous mixture was produced. The temperature during mixing was held constant at 120° F. The temperature of the mixture was then increased to 150° F. 1.2 cc. of formic acid (90% active), was then added to this homogeneous mixture. The composite coating composition exhibited a viscosity of 17 seconds as measured at 120° F. with a No. 3 cup on a Zahn viscometer.

The temperature of this coating composition was then maintained at 120° F. The coating composition was then applied to the wire side of 69 lb. fourdrinier kraft linerboard. A coating of 2 lbs. per M s.f. was achieved. A coated linerboard was then dried at 212° F. for approximately 2 minutes. The sample of this coated fiberboard was tested on a 6″ x 10″ polyflex panel (.020″ thickness) at room temperature on an S and S Scuff Tester versus a control sample of 69 lb. uncoated fourdrinier kraft linerboard. The coated sample resisted abrasion while the uncoated sample showed a high degree of abrasion on the polyflex panel after ten cycles.

EXAMPLE VIII

A coating composition was prepared by the addition of 30 grams of PD 185 which was at room temperature to 170 grams of water which is at a temperature of 140° F. The PD 185 and water were then mixed. PD 185 is a reaction product of one mole diethanolamine with one mole of cosmetic grade stearic acid which is in fact, a mixture of palmitic and stearic acids. To this mixture was added 2 grams of Green MX dye (solid). After mixing, a globular paste was obtained.

The temperature of this coating composition was allowed to cool to room temperature. The coating composition was then applied to the wire side of 69 lb. kraft fiberboard. A coating of 2 lbs. per M s.f. was achieved. The coated linerboard was then dried at 220° F. for about 5 minutes. The sample of this coated fiberboard was tested on a 6″ x 10″ (.020″ thickness) polyflex panel at room temperature on an S and S Scuff Tester versus a control sample of 69 lb. uncoated fourdrinier kraft linerboard.

The coated sample resisted abrasion while the uncoated sample showed a high degree of abrasion of the polyflex plate.

EXAMPLE IX

A coating composition was prepared by the addition of 30 grams of F–100 which was at room temperature to 170 grams of water which is at a temperature of 140° F. This mixture was stirred until a thick homogeneous paste was obtained. F–100 is a product of the Burkart-Schier Chemical Company and is produced by condensing a branched chain fatty acid having 18 carbon atoms with a blend of lower straight and branch chain alkanolamines. To 100 grams of this paste was added 0.06 grams of Green MX dye. The composite coating composition exhibited a viscosity of 13–15 seconds as measured at 110° F. with a No. 3 cup on a Zahn cup viscometer.

The coating composition (at room temperature) was then applied to the wire side of 69 lb. kraft linerboard. A coating of 2 lbs. per M s.f. was achieved. The coated linerboard was dried at 220° F. for about 5 minutes. The sample of this coated linerboard was tested on a 6″ x 10″ (.020″ thickness) polyflex panel at room temperature on an S and S Scuff Tester versus control samples of 69 lb. uncoated fourdrinier kraft linerboard.

The coated sample resisted abrasion while the uncoated sample showed a high degree of abrasion.

EXAMPLE X

Television bulb faceplates were placed in receptacles which were formed from the coated corrugated board as described in Example I. The receptacles and television faceplates were then vibrated at 65 cycles per minute for 2 hours, as is specified by Group 10.7 of the Joint Electronic Devices Engineering Council. A comparative test was run with similar television faceplates which were placed in conventional uncoated corrugated board containers but which were protected by cellulose wadding. At the end of the 2 hour test period the television bulbs which were protected in accordance with this invention showed 47% less defects as compared to those which were protected by conventional cellulose wadding.

Likewise, the faceplates which were protected by the coated receptacles accumulated approximately 60% by weight less dust during the test period as compared with those which were protected by cellulose wadding. The dust which did accumulate on the bulbs which were protected by the coated receptacles was removed by simple air blowing procedures. In contrast, the dust that resulted from the uncoated receptacles and cellulose wadding tended to cling to the faceplates as the result of electrical attraction.

What is claimed is:

1. An article of manufacture comprising a fiberboard substrate, with an exterior unfinished surface and an anti-abrasive coating on at least part of said surface, said coating consisting essentially of a mixture of fatty acid alkanolamides and alkanolamines, said alkanolamide component being from about 60 to about 90 percent of said mixture.

2. The article of claim 1, wherein an exterior unfinished surface is coated with a composition consisting essentially of from about 5 to about 25 parts of a mixture of fatty acid alkanolamides and alkanolamines and from about 0.7 to about 3 parts of a viscosity improver, in an amount sufficient to impart non-abrasive qualities.

3. The article of claim 1, wherein an exterior unfinished surface is coated with a composition consisting essentially of from about 10 to 20 parts of a mixture of fatty acid alkanolamides and alkanolamines and from about 0.70 to about 1.25 parts of a viscosity improver in an amount sufficient to impart non-abrasive qualities.

4. The article of claim 1, wherein an exterior wire side is coated with a composition consisting essentially of about 13.20 parts of a mixture of fatty acid alkanolamides and alkanolamines and about 0.71 part of a salt of tetramethyl-para-amino-triphenylcarbinol, in an amount sufficient to impart non-abrasive qualities.

5. The article of claim 1, wherein the mixture of fatty acid alkanolamides and alkanolamines is the reaction product of a compound of the formula

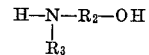

wherein $R_2$ and $R_3$ are independently hydrogen, straight or branch chain alkyl containing from 1 to 8 carbon atoms, straight or branched chain alkanol having from 1 to 8 carbon atoms, aryl, substituted and unsubstituted amino or substituted and unsubstituted amido, with a fatty acid containing from 8 to 22 carbon atoms.

6. The article of claim 2, wherein the mixture of fatty acid alkanolamides and alkanolamines is the reaction product of a compound of the formula

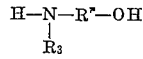

wherein $R_2$ and $R_3$ are independently hydrogen, straight or branch chain alkyl containing from 1 to 8 carbon atoms, straight or branched chain alkanol having from 1 to 8 carbon atoms, aryl, substituted and unsubstituted amino or substituted and unsubstituted amido, with a fatty acid containing from 8 to 22 carbon atoms.

7. The article of claim 3, wherein the mixture of fatty acid alkanolamides and alkanolamines is the reaction product of a compound of the formula

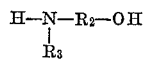

wherein $R_2$ and $R_3$ are independently hydrogen, straight or branch chain alkyl containing from 1 to 8 carbon atoms, straight or branched chain alkanol having from 1 to 8 carbon atoms, aryl, substituted and unsubstituted amino or substituted and unsubstituted amido, with a fatty acid containing from 8 to 22 carbon atoms.

8. The article of claim 4, wherein the mixture of fatty acid alkanolamides and alkanolamines is the reaction product of a compound of the formula

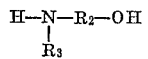

wherein $R_2$ and $R_3$ are independently hydrogen, straight or branch chain alkyl containing from 1 to 8 carbon atoms, straight or branched chain alkanol having from 1 to 8 carbon atoms, aryl, substituted and unsubstituted amino or substituted and unsubstituted amido, with a fatty acid containing from 8 to 22 carbon atoms.

9. The article of claim 6, wherein the fiberboard substrate is corrugated linerboard and the coating weight is from about 0.5 to about 2.2 pounds per thousand square feet.

10. The article of claim 7, wherein the fiberboard substrate is corrugated linerboard and the coating weight is from about 0.5 to about 2.2 pounds per thousand square feet.

11. The article of claim 1 wherein an exterior wire side is coated with from about 0.5 to about 2.2 pounds per thousand square feet of a composition consisting essentially of about 13.2 percent of a mixture of fatty acid alkanolamides and alkanolamines, about 89.09 percent water and about 0.71 percent of a salt of tetramethyl para-amino-triphenylcarbinol, said mixture of fatty acid alkanolamides and alkanolamines being the reaction product of diethanolamine with a mixture of palmitic and stearic acids.

12. An article of manufacture comprising a container which is formed from the product of claim 1, the coated surface forming the inner surface of the container.

13. An article of manufacture comprising a container which is formed from the fiberboard of claim 6, the coated surface forming the inner surface of the container.

14. An article of manufacture comprising a container which is formed from the fiberboard of claim 8, the coated surface forming the inner surface of the container.

15. An article of manufacture comprising a container which is formed from the fiberboard of claim 10, the coated surface forming the inner surface of the container.

16. An article of manufacture comprising a container which is formed from the fiberboard of claim 11, the coated surface forming the inner surface of the container.

References Cited

UNITED STATES PATENTS

| | | | |
|---|---|---|---|
| Re. 24,003 | 5/1955 | Ericks | 117—154 X |
| 892,074 | 6/1908 | Obici. | |
| 1,460,251 | 6/1923 | Kramer. | |
| 2,839,066 | 6/1958 | Sanders. | |
| 2,949,377 | 8/1960 | Steinhardt | 117—158 X |
| 3,244,734 | 4/1966 | Sonntag | 117—154 X |
| 2,629,648 | 2/1953 | Ericks | 117—155 X |
| 2,629,674 | 2/1953 | Ericks | 117—155 X |
| 2,629,701 | 2/1953 | Ericks | 117—155 X |
| 2,692,183 | 10/1954 | Ericks | 117—155 X |
| 3,210,211 | 10/1965 | Dunholter | 117—154 |

WILLIAM D. MARTIN, *Primary Examiner.*

M. LUSIGNAN, *Assistant Examiner.*

U.S. Cl. X.R.

117—154, 167